(12) United States Patent
Shitara et al.

(10) Patent No.: US 11,731,510 B2
(45) Date of Patent: Aug. 22, 2023

(54) AUTONOMOUS VEHICLE OPERATION DEVICE

(71) Applicants: Toyota Jidosha Kabushiki Kaisha, Toyota (JP); Kojima Industries Corporation, Toyota (JP)

(72) Inventors: Masaki Shitara, Nagakute (JP); Yasukazu Honda, Miyoshi (JP); Masahiro Nakamura, Toyota (JP); Makoto Kato, Hino (JP); Eiichi Yamamoto, Toyota (JP)

(73) Assignees: TOYOTA JIDOSHA KABUSHIKI KAISHA, Toyota (JP); KOJIMA INDUSTRIES CORPORATION, Toyota (JP)

( * ) Notice: Subject to any disclaimer, the term of this patent is extended or adjusted under 35 U.S.C. 154(b) by 0 days.

(21) Appl. No.: 16/907,839

(22) Filed: Jun. 22, 2020

(65) Prior Publication Data

US 2020/0406750 A1   Dec. 31, 2020

(30) Foreign Application Priority Data

Jun. 28, 2019   (JP) .................... 2019-121404

(51) Int. Cl.
*B60W 50/08* (2020.01)
*B60K 35/00* (2006.01)
*B60W 60/00* (2020.01)

(52) U.S. Cl.
CPC ......... *B60K 35/00* (2013.01); *B60W 60/0051* (2020.02); *B60W 60/0053* (2020.02); *B60K 2370/135* (2019.05); *B60K 2370/1438* (2019.05); *B60K 2370/167* (2019.05); *B60K 2370/172* (2019.05)

(58) Field of Classification Search
None
See application file for complete search history.

(56) References Cited

U.S. PATENT DOCUMENTS

| 10,392,007 | B1 | 8/2019 | Brown et al. |
| 10,589,679 | B1* | 3/2020 | Askeland ............... G06F 3/1431 |
| 2009/0177128 | A1 | 7/2009 | Fukuyama et al. |
| 2014/0022070 | A1* | 1/2014 | Golomb .................... B60Q 1/40 340/475 |
| 2015/0370329 | A1 | 12/2015 | Koyama |

(Continued)

FOREIGN PATENT DOCUMENTS

| CN | 107415957 A | 12/2017 |
| JP | H01120560 U | 8/1989 |

(Continued)

OTHER PUBLICATIONS

Non-Final Office Action dated Nov. 23, 2021 to U.S. Appl. No. 16/905,014, filed Jun. 18, 2020.

(Continued)

*Primary Examiner* — Genna M Mott
(74) *Attorney, Agent, or Firm* — Dinsmore & Shohl LLP

(57) ABSTRACT

An autonomous vehicle is provided with a touch panel that enables an operator to input vehicle speed control instructions during an automatic driving mode and a mechanical operation unit for inputting driving control instructions. The mechanical operation unit can be stored in a storage compartment covered with a lid.

5 Claims, 7 Drawing Sheets

(56) References Cited

U.S. PATENT DOCUMENTS

| | | | |
|---|---|---|---|
| 2017/0031382 A1* | 2/2017 | Niguet | B60K 37/06 |
| 2017/0267255 A1* | 9/2017 | Numazawa | B60W 10/18 |
| 2017/0334452 A1* | 11/2017 | Abe | G05D 1/0088 |
| 2018/0237013 A1 | 8/2018 | Inuzuka | |
| 2018/0281819 A1 | 10/2018 | Akaba et al. | |
| 2018/0362052 A1* | 12/2018 | Matsumoto | B60W 50/14 |
| 2018/0362070 A1* | 12/2018 | Letwin | G05D 1/0212 |
| 2019/0077288 A1* | 3/2019 | Gayon | B60N 2/773 |
| 2019/0092341 A1* | 3/2019 | Stark | B60W 50/12 |
| 2019/0106141 A1 | 4/2019 | Masu | |
| 2019/0144000 A1* | 5/2019 | Hennes | B60K 35/00 |
| | | | 701/23 |
| 2019/0265703 A1* | 8/2019 | Hicok | G06Q 50/30 |
| 2020/0001892 A1 | 1/2020 | Aoi et al. | |
| 2020/0307642 A1* | 10/2020 | Tsuji | B60W 50/14 |
| 2020/0359547 A1 | 11/2020 | Sakaguchi et al. | |
| 2020/0372418 A1 | 11/2020 | Hirose et al. | |
| 2020/0406930 A1* | 12/2020 | Ide | B60W 60/0025 |
| 2021/0039494 A1* | 2/2021 | Nageshkar | B60K 26/02 |
| 2021/0061299 A1* | 3/2021 | Wang | B60W 60/0053 |
| 2021/0145666 A1* | 5/2021 | Son | A61G 5/125 |
| 2021/0156468 A1 | 5/2021 | Petrzik | |

FOREIGN PATENT DOCUMENTS

| | | |
|---|---|---|
| JP | H05-286380 A | 11/1993 |
| JP | H05286382 A | 11/1993 |
| JP | H06082657 U | 11/1994 |
| JP | 2016-004541 A | 1/2016 |
| JP | 2017-170943 A | 9/2017 |
| JP | 2017-206153 A | 11/2017 |
| JP | 2018-136714 A | 8/2018 |
| JP | 2018147354 A | 9/2018 |
| JP | 2018-161085 A | 10/2018 |
| JP | 2018-172028 A | 11/2018 |
| JP | 2019-064557 A | 4/2019 |
| JP | 2019-097534 A | 6/2019 |
| WO | 2007034567 A1 | 3/2007 |
| WO | 2018174249 A1 | 9/2018 |
| WO | 2019026180 A1 | 2/2019 |
| WO | 2019052752 A1 | 3/2019 |

OTHER PUBLICATIONS

Notice of Allowance dated Apr. 8, 2022 to U.S. Appl. No. 16/905,014, filed Jun. 18, 2020.

Second Notice of Allowance dated Aug. 26, 2022 to related U.S. Appl. No. 16/905,014, filed Jun. 18, 2020.

Corrected Notice of Allowability dated Oct. 31, 2022 to U.S. Appl. No. 16/905,014, filed Jun. 18, 2020.

* cited by examiner

AUTONOMOUS VEHICLE OPERATION DEVICE

CROSS REFERENCE TO RELATED APPLICATION

This application claims priority to Japanese Patent Application No. 2019-121404 filed on Jun. 28, 2019, which is incorporated herein by reference in its entirety including the specification, claims, drawings, and abstract.

TECHNICAL FIELD

The present description discloses an autonomous vehicle operation device.

BACKGROUND

Autonomous vehicles capable of performing automatic driving are conventionally known. Automatic driving means that a computer executes at least a part of various driving controls including vehicle speed control and steering control.

It is conventionally known that, even in an autonomous vehicle capable of performing autonomous driving, an operator in the autonomous vehicle may want to perform driving control, and there has been a case of providing a mechanical operation unit in the autonomous vehicle for enabling the operator to perform driving control for the autonomous vehicle. The mechanical operation unit is not a foot-operated pedal such as an accelerator pedal or a brake pedal provided in conventional automotive vehicles, and is provided higher than a seat surface of an operator's seat to enable hand operation by the operator.

For example, JP 2018-136714 A discloses an autonomous vehicle capable of performing autonomous driving, in which a mechanical operation unit (a joystick) is provided for enabling an operator to manually perform vehicle speed control in the automatic driving mode.

Incidentally, there is a case where an autonomous vehicle is used as a shared vehicle for riding by an unspecified large number of occupants. In such a case, if the mechanical operation unit is operated by an occupant other than an operator, a driving instruction not intended by the operator may be input and the driving of the autonomous vehicle may be disturbed.

An autonomous vehicle operation device disclosed in the present description is applicable to a shared autonomous vehicle including a mechanical operation unit that enables an operator to perform driving control and intends to suppress operation of the mechanical operation unit by an occupant other than the operator.

SUMMARY

The autonomous vehicle operation device disclosed in the present description is an operation device for a shared autonomous vehicle that is capable of performing automatic driving and is for riding by an unspecified large number of occupants, including a mechanical operation unit configured to perform driving control for the autonomous vehicle, wherein the mechanical operation unit can be stored in a storage compartment covered with a lid.

According to the above-mentioned configuration, by storing the mechanical operation unit in the storage compartment covered with the lid, operation of the mechanical operation unit by an occupant other than an operator can be suppressed.

It is desirable that the storage compartment is provided in an armrest disposed at either a left end or a right end in a passenger compartment of the autonomous vehicle.

It is desirable that a touch panel is provided at a front end of the armrest, and a vehicle speed control button for inputting a vehicle speed control instruction to the autonomous vehicle is displayed on the touch panel.

It is desirable that the mechanical operation unit includes a blinker switch for operating a blinker and a horn switch for activating a horn.

It is desirable that the mechanical operation unit includes a grip part and a switch pedestal part located above the grip part, and the blinker switch and the horn switch are provided on the switch pedestal part.

It is desirable that an emergency-stop operation unit is disposed between the touch panel and the mechanical operation unit on an upper surface of the armrest.

It is desirable that the autonomous vehicle can perform driving in an automatic driving mode for performing automatic driving and in a manual driving mode in which an operator in the autonomous vehicle performs driving control, and driving control of the autonomous vehicle by the mechanical operation unit is feasible in each of the automatic driving mode and the manual driving mode.

According to the autonomous vehicle operation device disclosed in the present description, in a shared autonomous vehicle including a mechanical operation unit that enables an operator to perform driving control, operation of the mechanical operation unit by an occupant other than the operator can be suppressed.

BRIEF DESCRIPTION OF DRAWINGS

Embodiment(s) of the present disclosure will be described based on the following figures, wherein.

DESCRIPTION OF EMBODIMENTS

Figure 1:
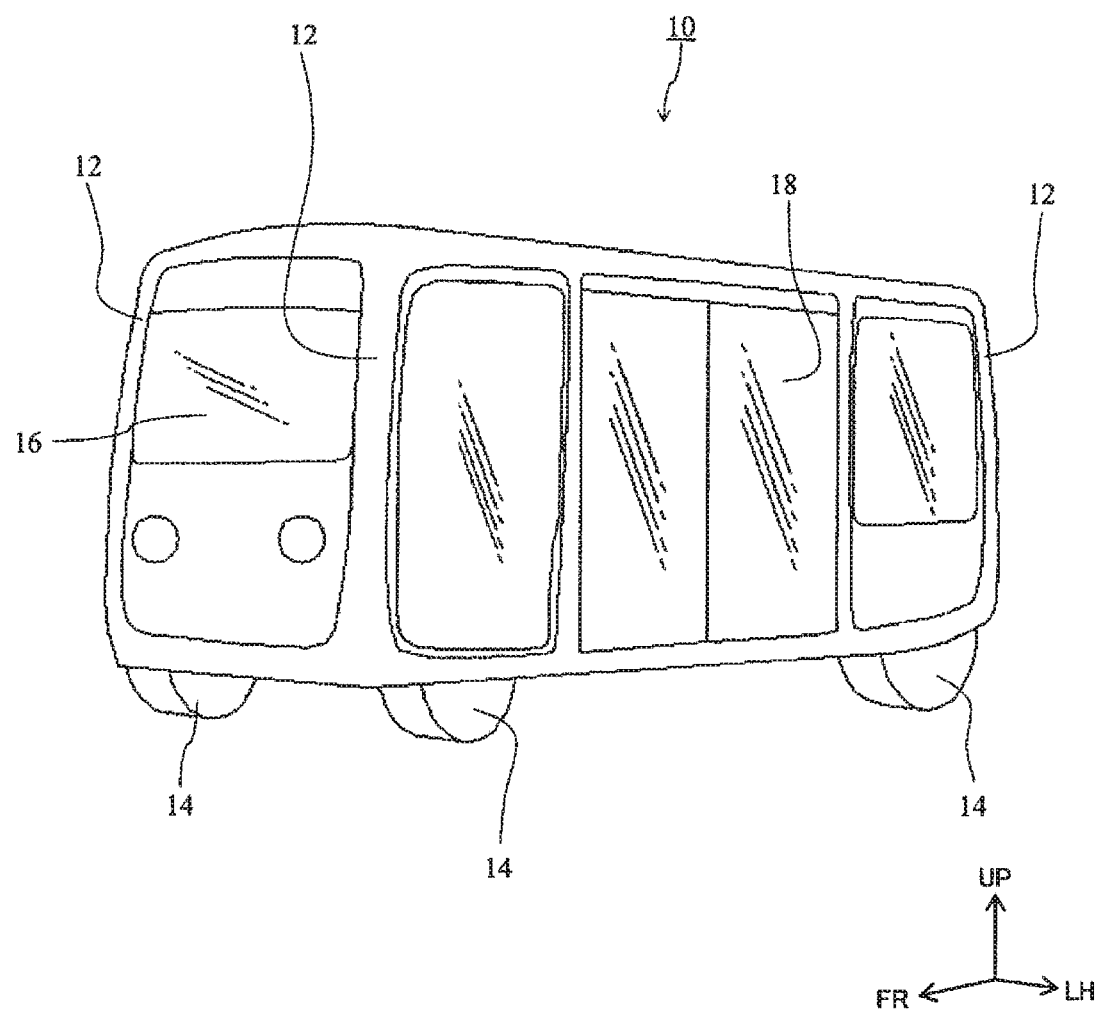
FIG. 1 is an external view illustrating an autonomous vehicle according to the present embodiment.

FIG. 1 is an external view illustrating an autonomous vehicle 10 according to the present embodiment. In each drawing of the present description, the terms "front (FR)" and "rear" indicate front and rear in the longitudinal direction of the vehicle, and the terms "left (LH)" and "right" indicate left and right when facing forward, and "up (UP)" and "down" indicate up and down in the vertical direction of the vehicle.

The autonomous vehicle 10 is a substantially rectangular parallelepiped and has a shape symmetrical in the front-rear direction, and an appearance design thereof is symmetrical in the longitudinal direction. A pillar 12 extending in the vertical direction is provided at each of four corners in a plan view, and a wheel 14 is provided below each pillar 12. Most of front, rear, left, and right side walls of the autonomous vehicle 10 are semitransparent panels 16. Each panel 16 may be configured as a display panel, on which characters or the like can be displayed.

A part of the left side panel is constituted as a slidable door 18, so that an occupant can get on and off by sliding and opening the door 18. Although not illustrated in FIG. 1, retractable ramp equipment configured to be taken out and in is stored below the door 18. The ramp equipment can be used for loading and unloading a wheelchair or the like.

Further, the autonomous vehicle 10 is a vehicle capable of performing autonomous driving. Specifically, the autonomous vehicle 10 is configured to perform driving in a plurality of driving modes including an automatic driving mode, a semi-automatic driving mode, and a manual driving mode.

The automatic driving mode is a driving mode in which a computer (serving as a driving control unit (described below)) mounted on the autonomous vehicle 10 performs most of the driving control. In the present description, the driving control is a concept including shift change control, vehicle speed control, and steering control. Further, the vehicle speed control is also a concept including start control, stop control, and acceleration/deceleration control for the autonomous vehicle 10. The autonomous vehicle 10 is configured to be able to communicate with a management center that manages and controls a plurality of autonomous vehicles 10. In the automatic driving mode, the autonomous vehicle 10 travels along a predetermined route under the control of the management center. In the automatic driving mode, the computer performs the driving control according to driving instructions from the management center. However, the start control performed in a stop state requires an operation by an operator in the autonomous vehicle 10.

The semi-automatic driving mode is a driving mode similar to the automatic driving mode in that the computer mounted on the autonomous vehicle 10 performs most of the driving control for the autonomous vehicle 10. In the semi-automatic driving mode, without depending on instructions from the management center, the computer performs driving control based on detection results obtained by various sensors (for example, a camera or a lidar) provided on the autonomous vehicle 10, travels along a predetermined route. However, even in the semi-automatic driving mode, the start control performed in a stop state requires an operation by an operator in the autonomous vehicle 10.

The manual driving mode is a mode in which the autonomous vehicle 10 does not perform autonomous driving and an operator in the autonomous vehicle 10 performs driving control for the autonomous vehicle 10.

The autonomous vehicle 10 is a shared vehicle for riding by an unspecified large number of occupants. In the present embodiment, the autonomous vehicle 10 is used as a bus that carries passengers while traveling along a predetermined route in a specific site. Accordingly, the autonomous vehicle 10 is supposed to repeat stopping and starting relatively frequently. Further, the autonomous vehicle 10 is supposed to travel relatively slowly (e.g., at 30 km/h or less).

However, the usage form of the autonomous vehicle 10 disclosed in the present description is appropriately changeable. For example, the autonomous vehicle 10 may be used as a movable business space, or as a shop such as a retail shop that displays and sells various commodities, or as a restaurant that cooks and provides food and drink. Further, as another form, the autonomous vehicle 10 may be used as an office for various types of office work, meeting with customers, and the like. Further, the use scene of the autonomous vehicle 10 is not limited to business use. For example, the autonomous vehicle 10 may be used as personal transportation means. Further, the traveling pattern or the traveling speed of the autonomous vehicle 10 may be changed appropriately.

Figure 2:
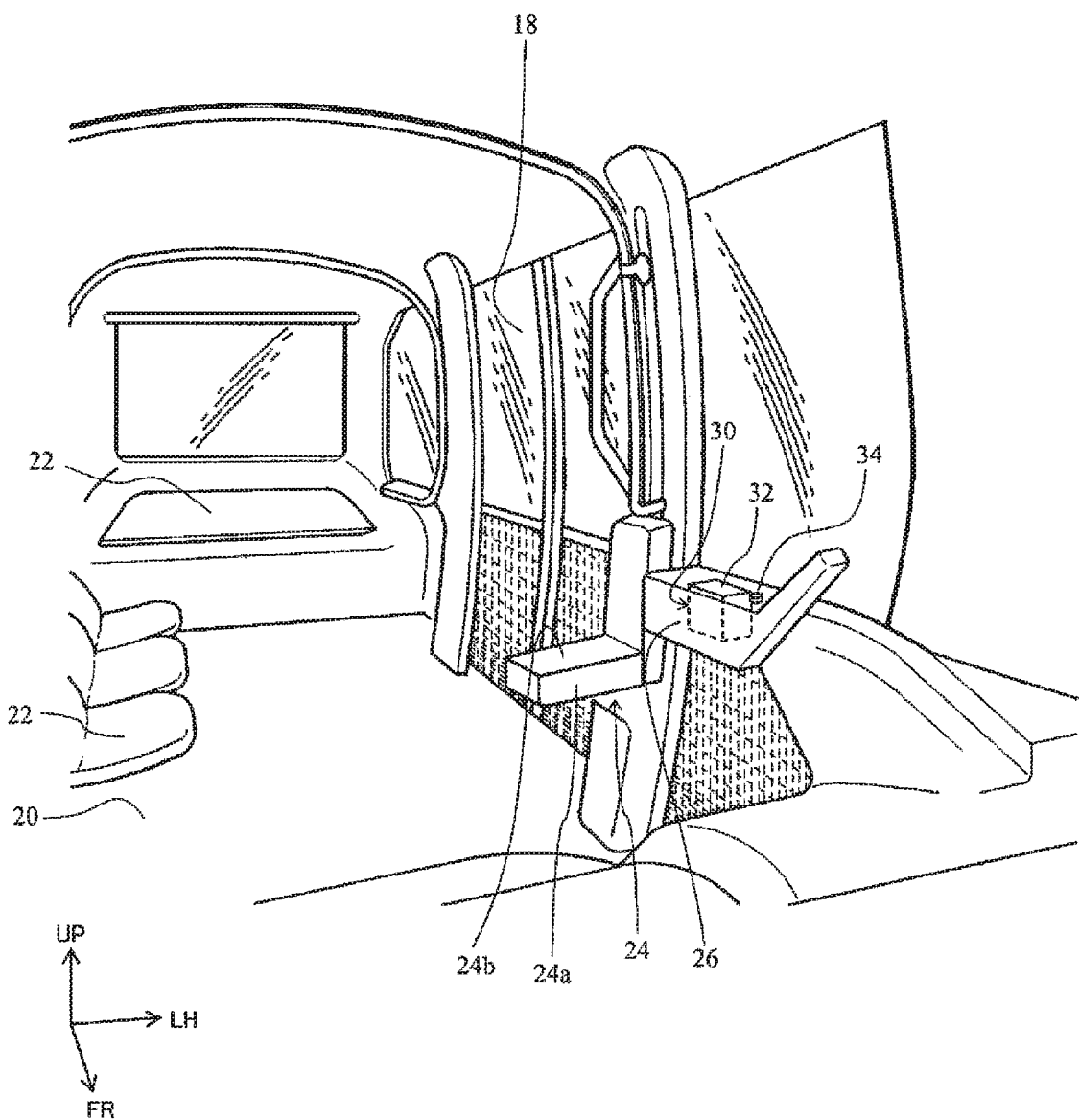
FIG. 2 is a first perspective diagram illustrating the interior of a passenger compartment of the autonomous vehicle according to the present embodiment.
Figure 3:
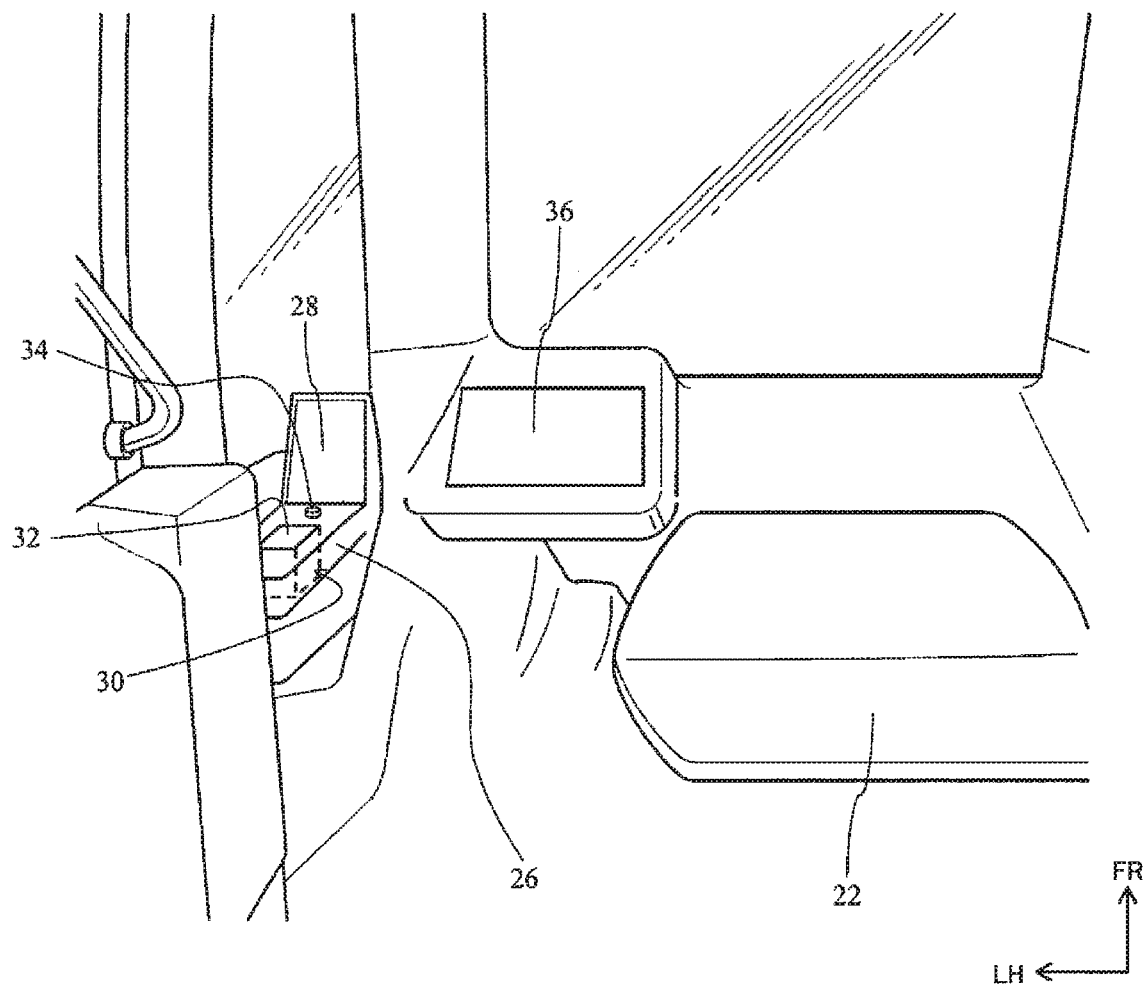
FIG. 3 is a second perspective diagram illustrating the interior of the passenger compartment of the autonomous vehicle according to the present embodiment.

The autonomous vehicle 10 is an electric vehicle having, as a prime mover, a driving motor that receives power supply from batteries. Each battery is a secondary battery configured to be chargeable and dischargeable, and is periodically charged by an external power source. The autonomous vehicle 10 is not limited to the electric vehicle and may be another type of vehicle. For example, the autonomous vehicle 10 may be a vehicle equipped with an engine (e.g., an internal combustion engine) serving as a prime mover, or may be a hybrid vehicle equipped with both an engine and a driving motor each serving as a prime mover. Further, the autonomous vehicle 10 may be a hydrogen fueled vehicle that drives a driving motor with electric power generated by fuel cells FIGS. 2 and 3 are perspective diagrams illustrating the interior of a passenger compartment of the autonomous vehicle 10. As mentioned above, since the autonomous vehicle 10 is used as a bus, the passenger compartment includes a central part configured as a floor 20 available for standing occupants or wheelchaired occupants. Further, occupant seats 22 are provided along sidewalls in the passenger compartment.

The autonomous vehicle 10 includes an operator seat 24 provided for an operator who controls driving of the autonomous vehicle 10 and operates each device (such as an air conditioner or windshield wipers) provided in the autonomous vehicle 10. FIG. 2 illustrates a state where a seat body 24a of the operator seat 24 is reclined so that a seat surface 24b appears. The seat body 24a is configured to be flipped up. In the present embodiment, the operator seat 24 is provided on the left side in the passenger compartment and adjacent to the front side of the door 18, although the operator seat 24 may be provided on the right side in the passenger compartment.

An armrest 26 extending in the front-rear direction to enable an operator sitting on the operator seat 24 to place his/her arm is provided on the front side of the operator seat 24. Although the armrest 26 is located on the front side of the operator seat 24, an occupant other than the operator can visually recognize the armrest 26, since the operator seat 24 is on the floor 20. As mentioned above, in the present embodiment, since the operator seat 24 is provided on the left side in the passenger compartment, the armrest 26 is disposed at the left end in the passenger compartment. If the operator seat 24 is provided on the right side in the passenger compartment, the armrest 26 is disposed at the right end in the passenger compartment. The armrest 26 is provided higher than the seat surface 24b of the operator seat 24 in a reclined state.

A touch panel 28 standing upright from an upper surface of the armrest 26 is provided at a front end of the armrest 26 (see FIG. 3). The touch panel 28 faces the rear side (that is, the operator seat 24 side). Accordingly, the operator can manually operate the touch panel 28 while sitting on the operator seat 24 and placing his/her arm on the armrest 26. The touch panel 28 enables the operator to input a vehicle speed control instruction during the automatic driving mode and input a device control instruction to each device (blinkers, a horn, headlights, the air conditioner, the windshield wipers, and the like) provided in the autonomous vehicle 10. A display screen of the touch panel 28 will be described in detail below.

Further, a storage compartment 30 such as a console box, which can store a mechanical operation unit for inputting a driving control instruction to the autonomous vehicle 10, is provided in the armrest 26. The storage compartment 30 is covered with a lid 32. That is, the mechanical operation unit when stored in the storage compartment 30 is not exposed to the interior of the passenger compartment. In the present embodiment, the upper surface of the armrest 26 and the lid 32 are disposed on the same plane. Although in the present embodiment the storage compartment 30 is provided in the armrest 26, the storage compartment 30 may be provided in a place other than the armrest 26. Even in such a case, it is desirable that the storage compartment 30 is provided in an inconspicuous place, for example, at one of front, rear, left, and right ends in the interior of the passenger compartment. The storage compartment 30, the lid 32, and the mechanical operation unit will be described in detail below.

Further, a mechanical emergency-stop operation unit 34 for inputting an (emergency) stop instruction to the autonomous vehicle 10 is provided on the upper surface of the armrest 26. In the present embodiment, the emergency-stop operation unit 34 is a button.

The autonomous vehicle 10 is provided with the touch panel 28, the mechanical operation unit, and the emergency-stop operation unit 34, as only three operation devices for inputting vehicle speed control instructions to the autonomous vehicle 10. That is, the autonomous vehicle 10 is not provided with a foot-operated pedal for inputting a vehicle speed control instruction, such as an accelerator pedal or a brake pedal provided in conventional automotive vehicles or the like.

A display device 36 that displays information relating to the autonomous vehicle 10 is provided at a front left corner in the passenger compartment (see FIG. 3). The information displayed on the display device 36 includes, for example, vehicle speed of the autonomous vehicle 10, ambient temperature, and the next stop. Like the touch panel 28, the display device 36 faces the rear side so that the touch panel 28 and the display device 36 are disposed side by side when seen by the operator sitting on the operator seat. Thus, suitably, the operator can visually recognize both the touch panel 28 and the display device 36. The display device 36 and the touch panel 28 may be positioned at the same height. Specifically, the touch panel 28 and the display device 36 are disposed in such a manner that the upper edge of the display device 36 and the upper edge of the touch panel 28 are at the same height, the lower edge of the display device 36 and the lower edge of the touch panel 28 are at the same height, or the altitudinal center of the display device 36 and the altitudinal center of the touch panel 28 are at the same height.

Figure 4:
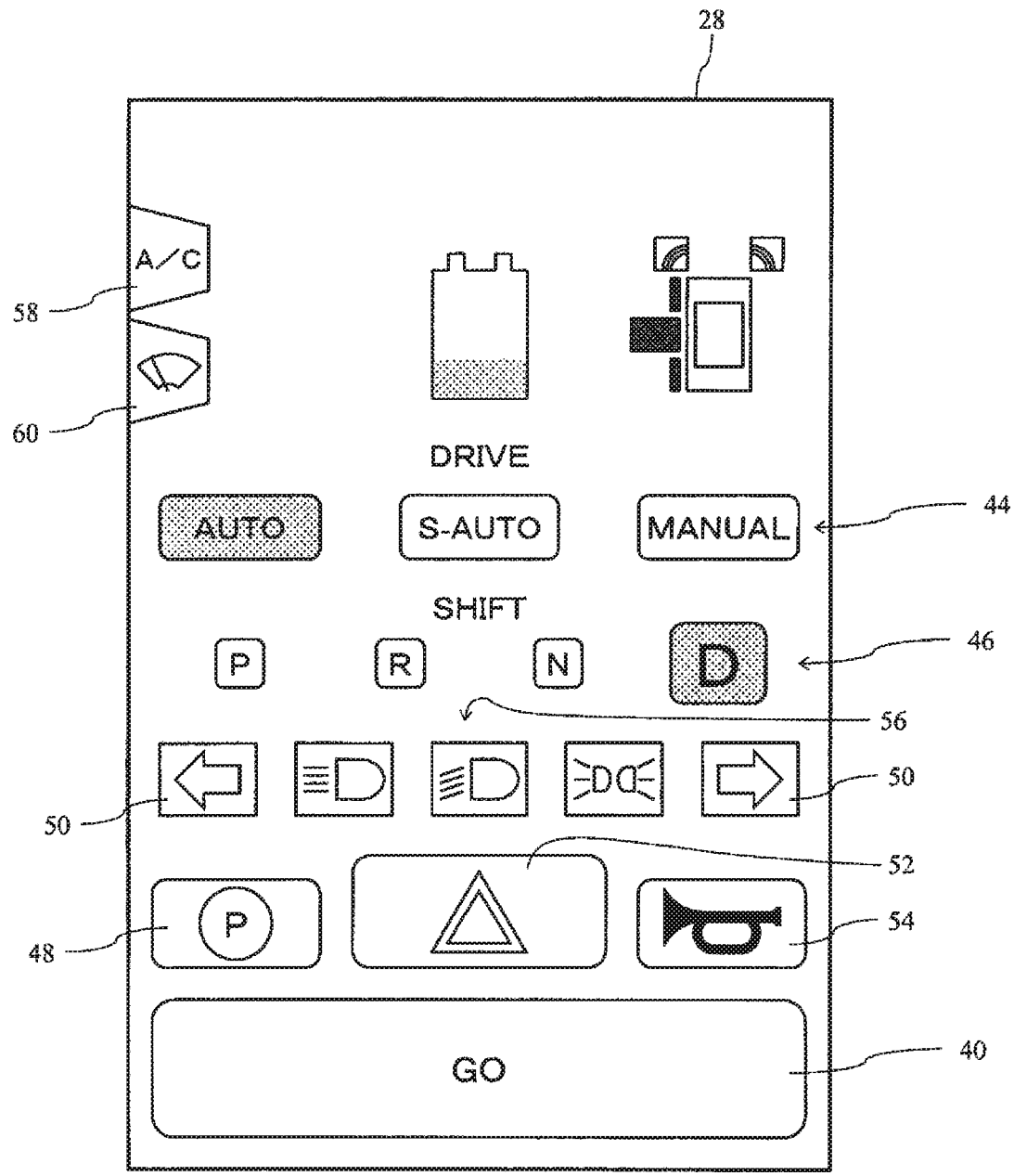
FIG. 4 is a diagram illustrating an exemplary screen of a touch panel to be displayed when the vehicle is stopped.
Figure 5:
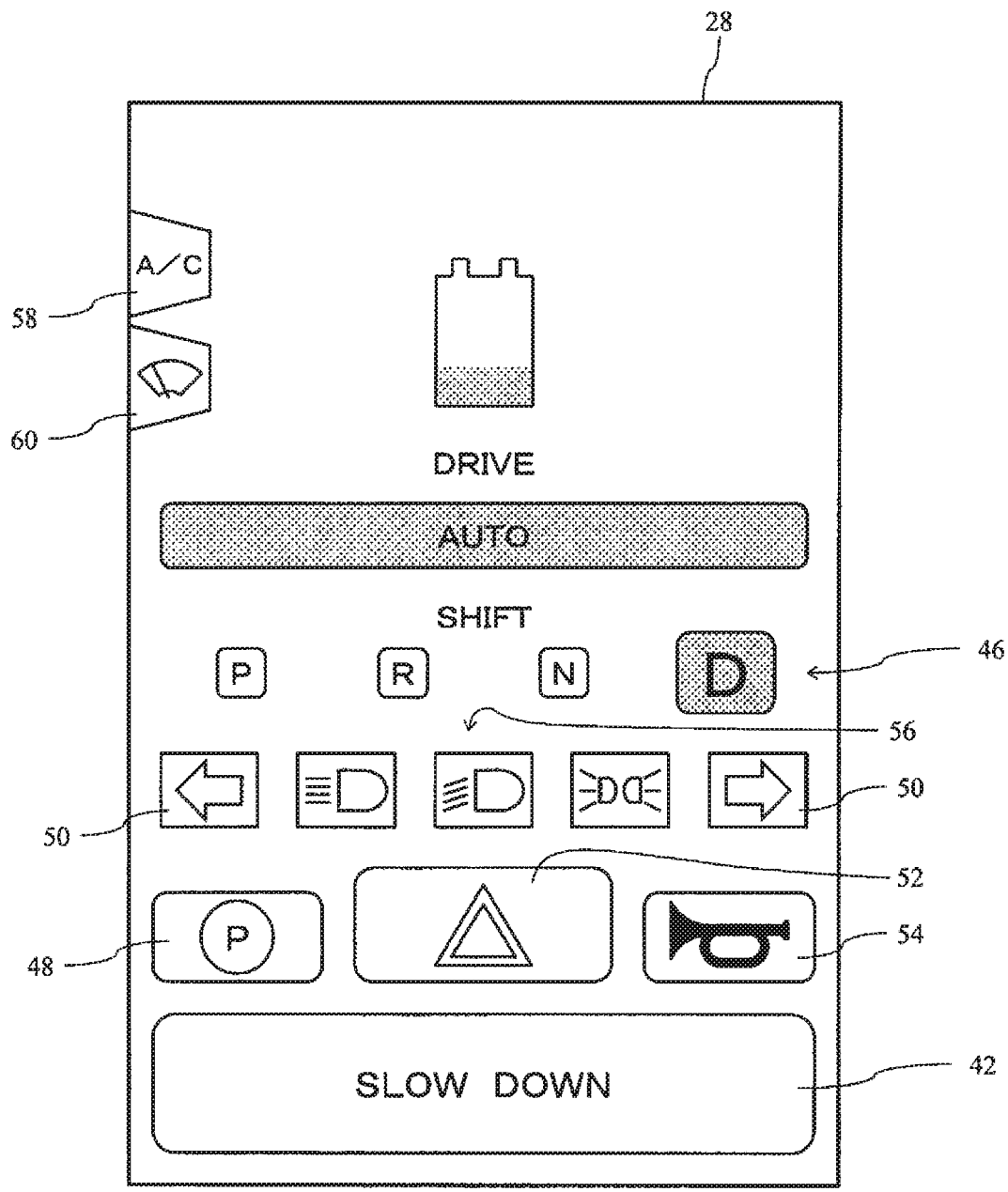
FIG. 5 is a diagram illustrating an exemplary screen of the touch panel to be displayed at the time of automatic traveling.

FIGS. 4 and 5 illustrate exemplary screens to be displayed on the touch panel 28. FIG. 4 illustrates an exemplary screen displayed when the autonomous vehicle 10 is in the automatic driving mode and is stopped. FIG. 5 is an exemplary screen displayed when the autonomous vehicle 10 is in the automatic driving mode and is traveling.

First, with reference to FIG. 4, when the autonomous vehicle 10 is in the automatic driving mode and is stopped, a GO button 40 serving as a vehicle speed control button for inputting a vehicle speed control instruction to the autonomous vehicle 10 is displayed on the touch panel 28. The GO button 40 is a button for inputting a start instruction to the autonomous vehicle 10. When the GO button 40 is operated, the autonomous vehicle 10 starts traveling (in the automatic driving mode, in this case).

Next, with reference to FIG. 5, when the autonomous vehicle 10 is in the automatic driving mode and is traveling, a SLOWDOWN button 42 serving as a vehicle speed control button is displayed on the touch panel 28, instead of the GO button 40. The SLOWDOWN button 42 is a button for inputting a deceleration control instruction to the autonomous vehicle 10. When the SLOWDOWN button 42 is operated, the autonomous vehicle 10 decelerates. The SLOWDOWN button 42 may be repetitively operated to cause the autonomous vehicle 10 to stop as intended.

In the present embodiment, when the vehicle is traveling in the automatic driving mode, the vehicle speed control that the operator can input is only the deceleration control instruction. However, in addition to the SLOWDOWN button 42, a button for inputting an acceleration control instruction or a button for inputting a stop instruction may be displayed so that the operator can input the acceleration control instruction or the stop instruction. Needless to say, in the automatic driving mode, the autonomous vehicle 10 can automatically decelerate or stop according to an instruction from the management center. When the autonomous vehicle 10 is stopped, the GO button 40 is displayed again, instead of the SLOWDOWN button 42, as illustrated in FIG. 4.

The vehicle speed control buttons are not limited to the ones operable by the operator to directly input vehicle speed control instructions to the autonomous vehicle 10. That is, in addition to the GO button 40 and the SLOWDOWN button 42 for directly controlling the vehicle speed described in the present embodiment, the vehicle speed control buttons may include buttons for performing other controls and indirectly (consequently) controlling the vehicle speed.

Buttons displayed on the touch panel 28 include, in addition to the vehicle speed control button, driving mode buttons 44 for inputting driving mode change instructions, shift buttons 46 for inputting shift change control instructions, a P brake button 48 for inputting a motor-driven parking brake activation/release instruction, and various device control buttons for inputting device control instructions to devices provided in the autonomous vehicle 10. According to the examples illustrated in FIGS. 4 and 5, blinker buttons 50 for controlling blinkers, a hazard button 52 for activating a hazard warning system, a horn button 54 for operating the horn, light buttons 56 for controlling headlights and taillights, an air conditioner tab 58 for controlling the air conditioner, and a windshield wiper tab 60 for controlling the windshield wipers are displayed as the device control buttons. When the air conditioner tab 58 is touched, various buttons for controlling the air conditioner are displayed. When the windshield wiper tab 60 is touched, various buttons for controlling the windshield wipers are displayed. The driving mode buttons 44 are operable only when the autonomous vehicle 10 is stopped. Further, in the present embodiment, the shift buttons 46 are not operable in the automatic driving mode, because shift change by an operator's operation is restricted.

Further, other information displayed on the touch panel 28 includes remaining battery level of the autonomous vehicle 10, opened/closed state of the door 18, state of the ramp equipment, and detection states of various sensors provided in the autonomous vehicle 10.

Figure 6:
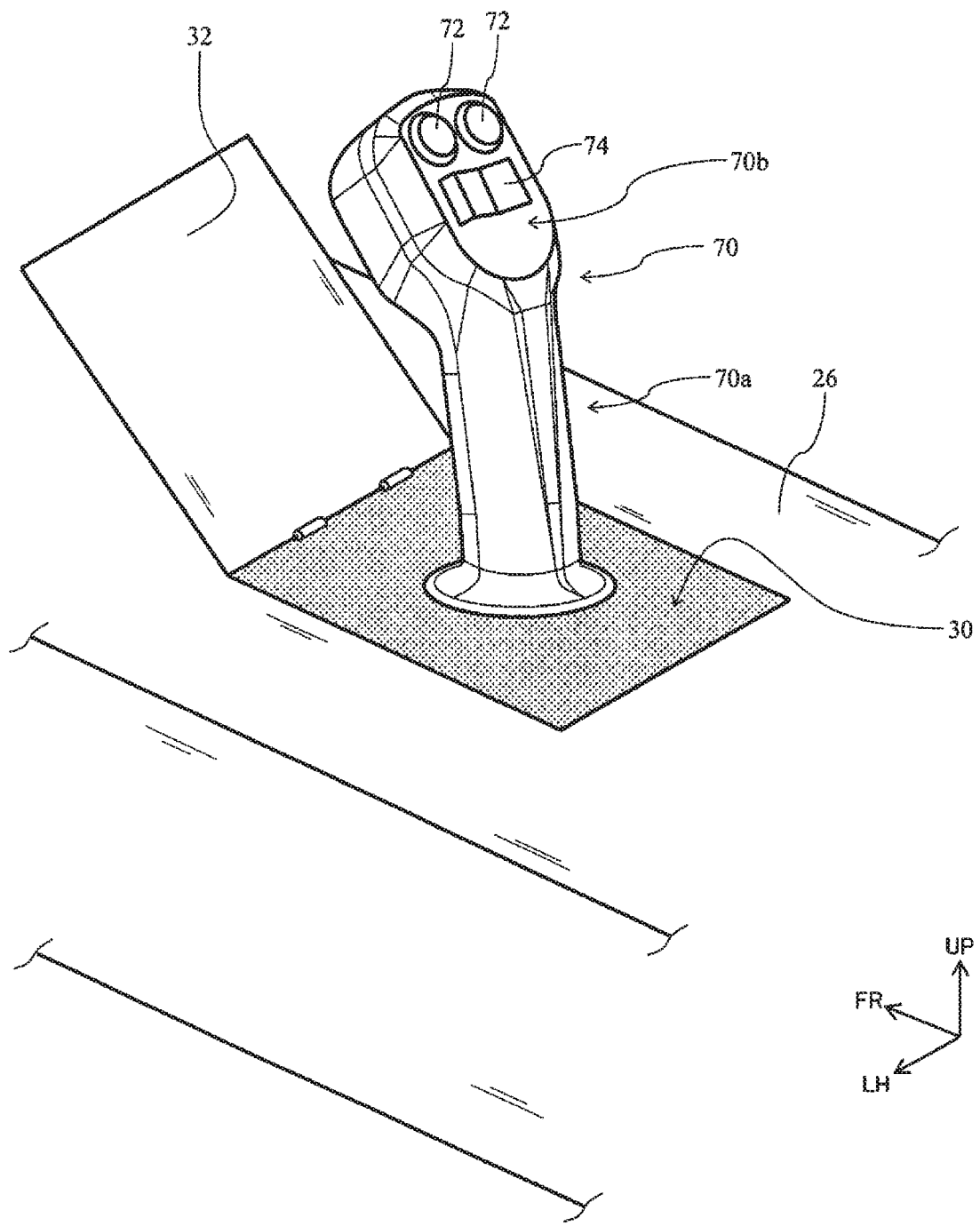
FIG. 6 is a perspective diagram illustrating a mechanical operation unit.

FIG. 6 illustrates a mechanical operation unit 70 pulled out of the storage compartment 30. As mentioned above, the mechanical operation unit 70 is not the foot-operated pedal such as the accelerator pedal or the brake pedal provided in conventional automotive vehicles, and is provided higher than the seat surface of the operator seat 24 to enable hand operation by the operator. In particular, the mechanical operation unit 70 has a mechanical mechanism for inputting driving control instructions to the autonomous vehicle 10. In the present embodiment, the mechanical operation unit 70 has a stick shape, although the shape of the mechanical operation unit 70 is not limited to this example. For example, the mechanical operation unit 70 may be a spherical lever. The mechanical operation unit 70 keeps an upright posture when stored in the storage compartment 30 so as to be raised in the vertical direction. Storing the mechanical operation unit 70 in the storage compartment 30 can prevent erroneous operation of the mechanical operation unit 70 by the operator or prevent operation of the mechanical operation unit 70 by another occupant. The lid 32 may be configured to be locked so that occupants other than the operator cannot open the lid 32. Further, an unlocking mechanism for releasing the lock when the lid 32 is slid (for example, slid in the horizontal direction) may be employed. The space in the vehicle can be effectively used when the mechanical operation unit 70 is stored in the storage compartment 30.

When the operator opens the lid 32 and pulls out the mechanical operation unit 70 upward, the mechanical operation unit 70 becomes operable as illustrated in FIG. 6. Alternatively, a switch may be provided in the storage compartment 30, so that the mechanical operation unit 70 automatically moves upward from the storage compartment 30 when the switch is operated. In the operable state, the mechanical operation unit 70 is in a state where it stands upright from the upper surface of the armrest 26. As described above, since the armrest 26 is provided higher than the seat surface 24b of the operator seat 24 in the reclined state, it is obvious that the mechanical operation unit 70 is positioned higher than the seat surface 24b in the reclined state.

The mechanical operation unit 70 is mainly pulled out of the storage compartment 30 when the driving mode of the autonomous vehicle 10 is the manual driving mode. When the driving mode of the autonomous vehicle 10 is the automatic driving mode or the semi-automatic driving mode, it is desirable that the mechanical operation unit 70 is stored in the storage compartment 30 so as to prevent erroneous operation of the mechanical operation unit 70.

The mechanical operation unit 70 is configured to include a grip part 70a, and a switch pedestal part 70b located above the grip part 70a. The operator, while gripping the grip part 70a, can perform a lever operation for the mechanical operation unit 70. That is, the mechanical operation unit 70 is configured to be tiltable in the front, rear, left, and right directions with a lower edge thereof as a fulcrum. When the mechanical operation unit 70 is tilted forward, an acceleration control instruction can be input to the autonomous vehicle 10. When the mechanical operation unit 70 is tilted rearward, a deceleration control instruction can be input to the autonomous vehicle 10. Further, when the mechanical operation unit 70 is tilted leftward, a left-turn control instruction can be input to the autonomous vehicle 10. When the mechanical operation unit 70 is tilted rightward, a right-turn control instruction can be input to the autonomous vehicle 10.

Further, mechanical device control switches for inputting device control instructions to the devices provided in the autonomous vehicle 10 are provided at an upper part of the mechanical operation unit 70. In the present embodiment, switches for controlling the notification to the outside of the vehicle are provided as the device control switches. Specifically, blinker switches 72 for operating the blinkers and a horn switch 74 for activating the horn are provided on the switch pedestal part 70b. As described above, the mechanical operation unit 70 can be used not only when instructing the acceleration/deceleration control and the turning control but also when operating the blinkers and the horn. Needless to say, the device control switches on the mechanical operation unit 70 may include additional switches for controlling other devices. Providing the blinker switches 72 and the horn switch 74 on the switch pedestal part 70b located above the grip part 70a enables the operator to operate the blinker switches 72 and the horn switch 74 while gripping the grip part 70a.

In the present embodiment, the touch panel 28 is disposed at the front end of the armrest 26 and the mechanical operation unit 70 stands upright on the armrest 26. That is, the touch panel 28 and the mechanical operation unit 70 are disposed adjacently. In the present embodiment, even when the driving control is performed using the mechanical operation unit 70, the touch panel 28 is usable to operate the devices provided in the autonomous vehicle 10. Accordingly, since the touch panel 28 and the mechanical operation unit 70 are adjacent to each other, the operator can suitably operate both the touch panel 28 and the mechanical operation unit 70.

Figure 7:
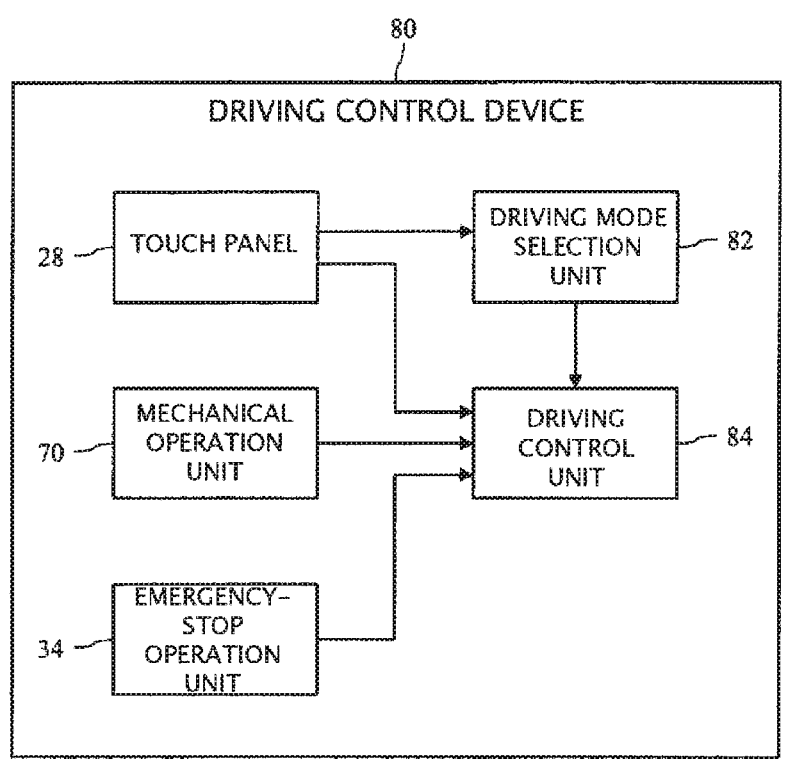
FIG. 7 is a functional block diagram illustrating a driving control device according to the present embodiment.

FIG. 7 is a functional block diagram illustrating a driving control device 80 provided on the autonomous vehicle 10. The driving control device 80 includes the touch panel 28, the emergency-stop operation unit 34, and the mechanical operation unit 70, which are described above, and is configured to further include a driving mode selection unit 82 and a driving control unit 84. The driving mode selection unit 82 and the driving control unit 84 can be realized by cooperation of hardware such as a processor and software that causes the hardware to operate.

The driving mode selection unit 82 selects, as the driving mode of the autonomous vehicle 10, any one of the automatic driving mode, the semi-automatic driving mode, and the manual driving mode. Specifically, the driving mode selection unit 82 selects the driving mode of the autonomous vehicle 10 based on the driving mode change instruction that has been input to the touch panel 28 by the operator. The driving mode selected by the driving mode selection unit 82 is notified to the driving control unit 84.

The driving control unit 84 performs driving control for the autonomous vehicle 10 based on an instruction input from the touch panel 28, the emergency-stop operation unit 34, or the mechanical operation unit 70.

Specifically, upon receiving the start instruction from the touch panel 28 when the GO button 40 (see FIG. 4) of the touch panel 28 is touched, the driving control unit 84 releases the motor-driven parking brake and controls the prime mover to cause the autonomous vehicle 10 to start traveling. Further, upon receiving the deceleration control instruction from the touch panel 28 when the SLOWDOWN button 42 (see FIG. 5) of the touch panel 28 is touched, the driving control unit 84 controls the prime mover and the brake to cause the autonomous vehicle 10 to decelerate.

When the mechanical operation unit 70 is tilted forward, the driving control unit 84 controls the prime mover to accelerate the autonomous vehicle 10 upon receiving the acceleration control instruction from the mechanical operation unit 70. Further, when the mechanical operation unit 70 is tilted rearward, the driving control unit 84 controls the prime mover or the brake to cause the autonomous vehicle 10 to decelerate upon receiving the deceleration control instruction from the mechanical operation unit 70. Further, when the mechanical operation unit 70 is tilted leftward, the driving control unit 84 controls the directions of the wheels 14 of the autonomous vehicle 10 to cause the autonomous vehicle 10 to turn left upon receiving the left-turn control instruction from the mechanical operation unit 70. When the mechanical operation unit 70 is tilted rightward, the driving control unit 84 controls the directions of the wheels 14 of the autonomous vehicle 10 to cause the autonomous vehicle 10 to turn right upon receiving the right-turn control instruction from the mechanical operation unit 70.

Further, when the emergency-stop operation unit 34 is operated, the driving control unit 84 controls the prime mover and the brake to cause the autonomous vehicle 10 to stop immediately upon receiving the stop instruction from the emergency-stop operation unit 34.

In the case of operation in the automatic driving mode, the driving control unit 84 performs driving control for the autonomous vehicle 10 based on driving instructions received from the management center. Further, in the case of operation in the semi-automatic driving mode, the driving control unit 84 performs driving control for the autonomous vehicle 10 based on detection results by various sensors of the autonomous vehicle 10.

As mentioned above, the driving control unit 84 executes the driving control including the vehicle speed control for the autonomous vehicle 10. Accordingly, the driving control unit 84 functions as a vehicle speed control unit, and the driving control device 80 functions as a vehicle speed control device.

Irrespective of the driving mode of the autonomous vehicle 10, the driving control unit 84 can perform driving control for the autonomous vehicle 10 based on driving control instructions from the touch panel 28 and the mechanical operation unit 70. However, when the driving mode of the autonomous vehicle 10 is either the automatic driving mode or the semi-automatic driving mode, the driving control unit 84 prioritizes a vehicle speed control instruction input from the touch panel 28 over a vehicle speed control instruction input from the mechanical operation unit 70 and executes the vehicle speed control for the autonomous vehicle 10 based on the prioritized instruction.

For example, prioritizing the vehicle speed control instruction input from the touch panel 28 in the automatic driving mode or the semi-automatic driving mode invalidates the vehicle speed control instruction input from the mechanical operation unit 70, after the vehicle speed control instruction is input by the touch panel 28, until the driving control unit 84 completes the vehicle speed control. Specifically, when the SLOWDOWN button 42 of the touch panel 28 is touched, the driving control unit 84 ignores the acceleration control instruction from the mechanical operation unit 70 and causes the autonomous vehicle 10 to decelerate, until the driving control unit 84 completes the deceleration control, even when the mechanical operation unit 70 is tilted forward.

Alternatively, in the case of operation in the automatic driving mode or the semi-automatic driving mode, the vehicle speed control instruction from the touch panel 28 may be prioritized by not receiving any vehicle speed control instruction from the mechanical operation unit 70. In this case, in the automatic driving mode or the semi-automatic driving mode, any vehicle speed control instruction from the mechanical operation unit 70 is invalidated, regardless of whether the operator is operating the touch panel 28.

In the case of operation in the automatic driving mode, the driving control unit 84 performs driving control for the autonomous vehicle 10 based on driving instructions from the management center. However, the vehicle speed control instructions from the touch panel 28 and the mechanical operation unit 70 are prioritized over the vehicle speed control instructions from the management center. Further, in the case of operation in the semi-automatic driving mode, the driving control unit 84 performs driving control for the autonomous vehicle 10 based on detection results by various sensors of the autonomous vehicle 10. However, the vehicle speed control instructions from the touch panel 28 and the mechanical operation unit 70 are prioritized over the vehicle speed control instructions based on detection results of various sensors.

As described above, in the present embodiment, the vehicle speed control instructions input from the touch panel 28 are prioritized over the vehicle speed control instructions input from the mechanical operation unit 70 in the automatic driving mode. Therefore, even when the mechanical operation unit 70 is unwantedly operated by the operator or another occupant while the operator is performing vehicle speed control using the touch panel 28, performance of any vehicle speed control not intended by the operator can be suppressed.

When the driving mode of the autonomous vehicle 10 is the manual driving mode, the driving control unit 84 may prioritize the vehicle speed control instructions input from the mechanical operation unit 70 over the vehicle speed control instructions input from the touch panel 28 and execute the vehicle speed control for the autonomous vehicle 10 based on the prioritized instructions. For example, in the manual driving mode, after the mechanical operation unit 70 inputs a vehicle speed control instruction, until the driving control unit 84 completes the vehicle speed control, any vehicle speed control instruction input from the touch panel 28 may be invalidated.

In addition, irrespective of the driving mode of the autonomous vehicle 10, the driving control unit 84 prioritizes the stop instruction input from the emergency-stop operation unit 34 over the vehicle speed control instructions input from the touch panel 28 and the mechanical operation unit 70 and causes the autonomous vehicle 10 to stop immediately. Needless to say, the stop instruction input from the emergency-stop operation unit 34 is prioritized over the vehicle speed control instructions from the management center and the vehicle speed control instruction based on detection results by various sensors of the autonomous vehicle 10. That is, regardless of the driving mode of the autonomous vehicle 10, and regardless of how the touch panel 28 or the mechanical operation unit 70 is operated, the autonomous vehicle 10 immediately stops when the emergency-stop operation unit 34 is operated. Thus, the operator can stop the autonomous vehicle 10 at any time in an emergency.

Further, separately providing the emergency-stop operation unit 34 and the mechanical operation unit 70 can prevent erroneous operation of the emergency-stop operation unit 34 by the operator in the manual driving mode. Further, when the emergency-stop operation unit 34 is provided between the touch panel 28 and the mechanical operation unit 70 on the armrest 26, any occupant can visually recognize the emergency-stop operation unit 34 in the automatic driving mode, because the mechanical operation unit 70 can be stored in the storage compartment 30. That is, anyone can operate the emergency-stop operation unit 34 in case of emergency.

Although the embodiments of the autonomous vehicle operation device according to the present disclosure have been described, the autonomous vehicle operation device according to the present disclosure is not limited to the above-mentioned embodiments and can be changed or modified in various ways without departing from the gist thereof.

The invention claimed is:

1. An operation device for an autonomous vehicle that is capable of performing automatic driving and is a shared vehicle for riding by a plurality of occupants, comprising:
   a joystick configured to perform driving control for the autonomous vehicle, the joystick can be stored in a storage compartment provided in an armrest disposed at either a left end or a right end in a passenger compartment of the autonomous vehicle and covered with a lid;
   a touch panel provided at a front end of the armrest and displaying a vehicle speed control button for inputting a vehicle speed control instruction to the autonomous vehicle; wherein
   when the autonomous vehicle is in an autonomous driving mode or a semi-autonomous driving mode, the autonomous vehicle prioritizes vehicle speed control instructions input from the touch panel over vehicle speed control instructions input from the joystick; and
   when the autonomous vehicle is in a manual driving mode, the autonomous vehicle prioritizes vehicle speed control instructions input from the joystick over vehicle speed control instructions input from the touch panel.

2. The autonomous vehicle operation device according to claim 1, wherein
   the joystick includes a blinker switch for operating a blinker and a horn switch for activating a horn.

3. The autonomous vehicle operation device according to claim 2, wherein the joystick includes a grip part and a switch pedestal part located above the grip part, and the blinker switch and the horn switch are provided on the switch pedestal part.

4. The autonomous vehicle operation device according to claim 1, further comprising:
   a button disposed between the touch panel and the joystick on an upper surface of the armrest.

5. The autonomous vehicle operation device according to claim 1, wherein the autonomous vehicle can perform driving in an automatic driving mode for performing automatic driving and driving in a manual driving mode in which an operator on the autonomous vehicle performs driving control, and
   driving control of the autonomous vehicle by the joystick is feasible in each of the automatic driving mode and the manual driving mode.

* * * * *